US011973928B2

United States Patent
Mitani et al.

(10) Patent No.: US 11,973,928 B2
(45) Date of Patent: Apr. 30, 2024

(54) IMAGE DISPLAY DEVICE TO DISPLAY A PLURALITY OF VIEWPOINT IMAGES

(71) Applicant: SONY CORPORATION, Tokyo (JP)

(72) Inventors: Satoshi Mitani, Kanagawa (JP); Tomoya Yano, Kanagawa (JP); Yutaka Imai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 758 days.

(21) Appl. No.: 17/046,917

(22) PCT Filed: Mar. 18, 2019

(86) PCT No.: PCT/JP2019/011136
§ 371 (c)(1),
(2) Date: Oct. 12, 2020

(87) PCT Pub. No.: WO2019/208025
PCT Pub. Date: Oct. 31, 2019

(65) Prior Publication Data
US 2021/0160465 A1    May 27, 2021

(30) Foreign Application Priority Data
Apr. 25, 2018    (JP) .................... 2018-083669

(51) Int. Cl.
*H04N 13/351*    (2018.01)
*G02B 26/08*    (2006.01)
*H04N 9/31*    (2006.01)

(52) U.S. Cl.
CPC ........... *H04N 13/351* (2018.05); *G02B 26/08* (2013.01); *G02B 26/0808* (2013.01);
(Continued)

(58) Field of Classification Search
CPC .. H04N 13/351; H04N 9/3152; H04N 9/3161; H04N 9/3164; H04N 13/363;
(Continued)

(56) References Cited

U.S. PATENT DOCUMENTS

2004/0056824 A1*   3/2004  Sudo ................... H04N 13/398
                                                      348/E13.028
2008/0018808 A1*   1/2008  Seki ..................... H04N 9/3164
                                                      348/751
(Continued)

FOREIGN PATENT DOCUMENTS

AU      2005332290 B2 *  5/2011  ............. G02B 30/27
CN      103713463 A      4/2014
(Continued)

OTHER PUBLICATIONS

International Search Report and Written Opinion of PCT Application No. PCT/JP2019/011136, dated May 28, 2019, 10 pages of ISRWO.

*Primary Examiner* — Magda Cruz
(74) *Attorney, Agent, or Firm* — CHIP LAW GROUP

(57) ABSTRACT

An image display device according to the present disclosure includes: one or more image sources that output a two-dimensional projection image; and one or more image deflection sections that generate a plurality of area images by dividing the projection image from the image source into a plurality of areas at least in a horizontal direction, and deflects and projects, toward a screen having anisotropic diffusion properties, the plurality of area images at respective angles different from each other to partially overlap the plurality of area images with each other on the screen and thereby display images from a plurality of viewpoints.

18 Claims, 16 Drawing Sheets

(52) U.S. Cl.
CPC ..... G02B 26/0816 (2013.01); G02B 26/0833 (2013.01); H04N 9/3152 (2013.01); H04N 9/3161 (2013.01); H04N 9/3164 (2013.01)

(58) Field of Classification Search
CPC ................ G02B 26/08; G02B 26/0808; G02B 26/0816; G02B 26/0833; G02B 30/56; G03B 21/606; G03B 35/22
See application file for complete search history.

(56) References Cited

U.S. PATENT DOCUMENTS

| | | | | |
|---|---|---|---|---|
| 2012/0127320 | A1* | 5/2012 | Balogh | ................ H04N 13/363 353/121 |
| 2014/0104399 | A1* | 4/2014 | Lee | ...................... H04N 13/363 348/51 |
| 2015/0241843 | A1* | 8/2015 | Park | ..................... G03H 1/2294 359/11 |
| 2018/0176437 | A1 | 6/2018 | Wippermann et al. | |
| 2019/0297317 | A1* | 9/2019 | Lam | ....................... H04N 13/32 |
| 2019/0373154 | A1* | 12/2019 | Wippermann | ......... H04N 23/58 |

FOREIGN PATENT DOCUMENTS

| | | |
|---|---|---|
| CN | 108353115 A | 7/2018 |
| DE | 102015215836 A1 | 2/2017 |
| JP | 2006-184770 A | 7/2006 |
| JP | 2008-219618 A | 9/2008 |
| JP | 2013-210590 A | 10/2013 |
| JP | 2016-142991 A | 8/2016 |
| JP | 2018-083669 A | 5/2018 |
| JP | 2018-532145 A | 11/2018 |
| KR | 10-2015-0099688 A | 9/2015 |
| KR | 10-2018-0053644 A | 5/2018 |
| TW | 201713988 A | 4/2017 |
| WO | 2017/029365 A1 | 2/2017 |

* cited by examiner

[FIG. 1]
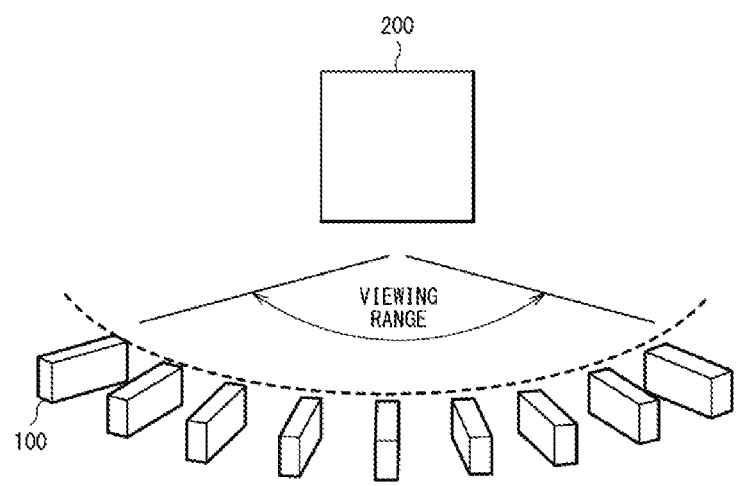
PRIOR ART

[ FIG. 2 ]
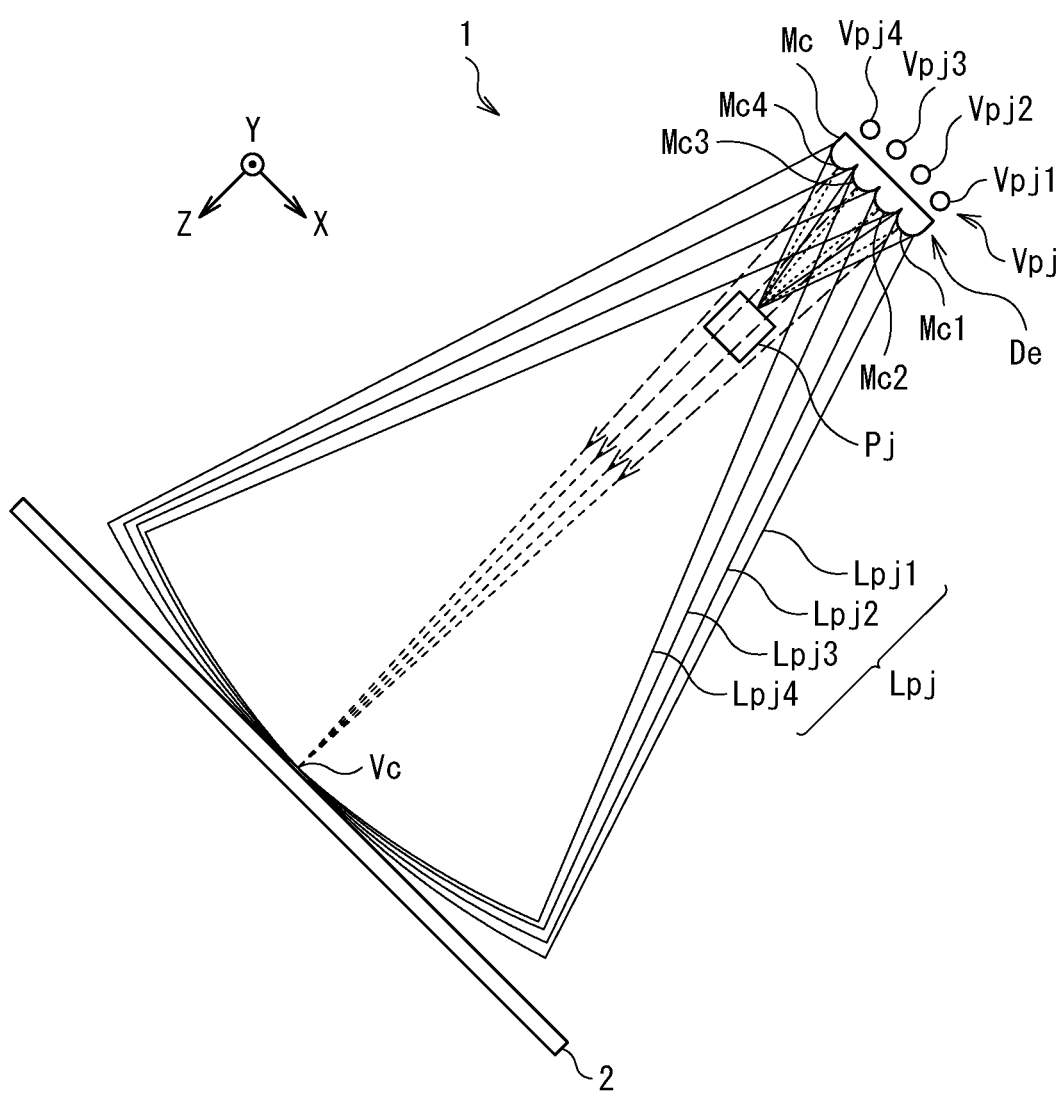

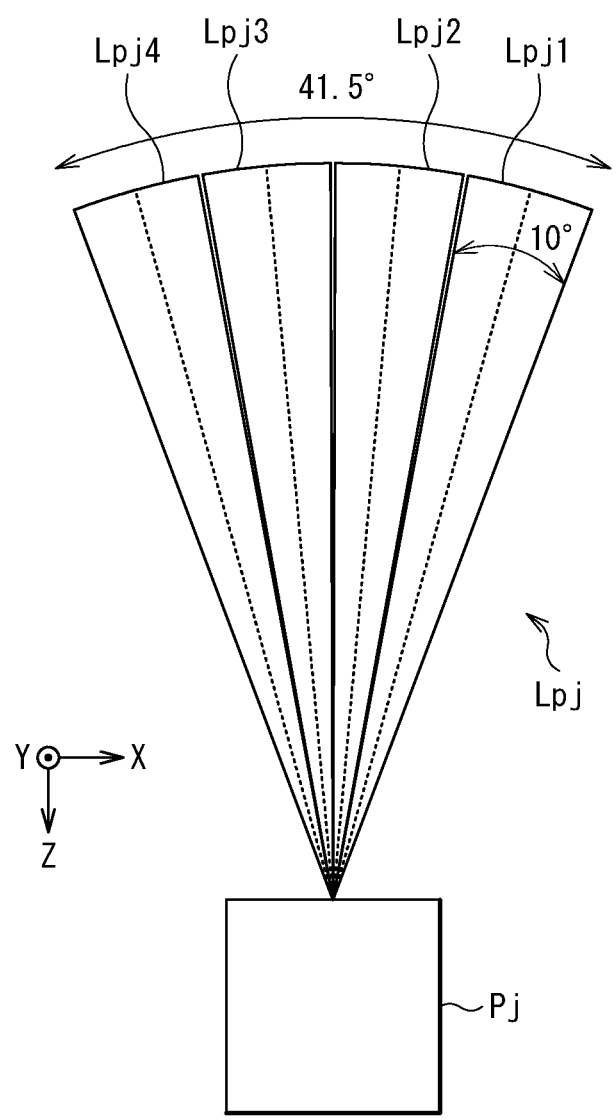
[ FIG. 3 ]

[ FIG. 4 ]
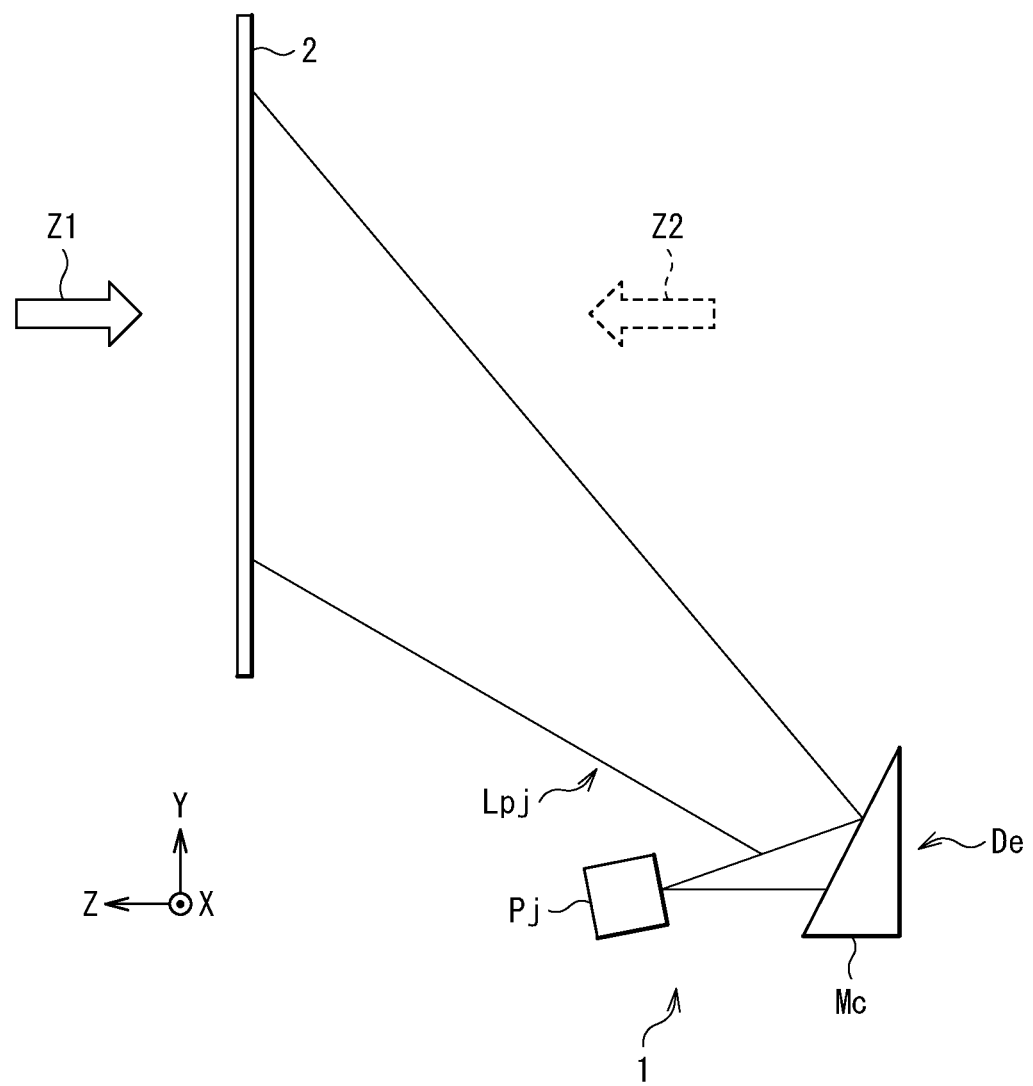

[ FIG. 5 ]
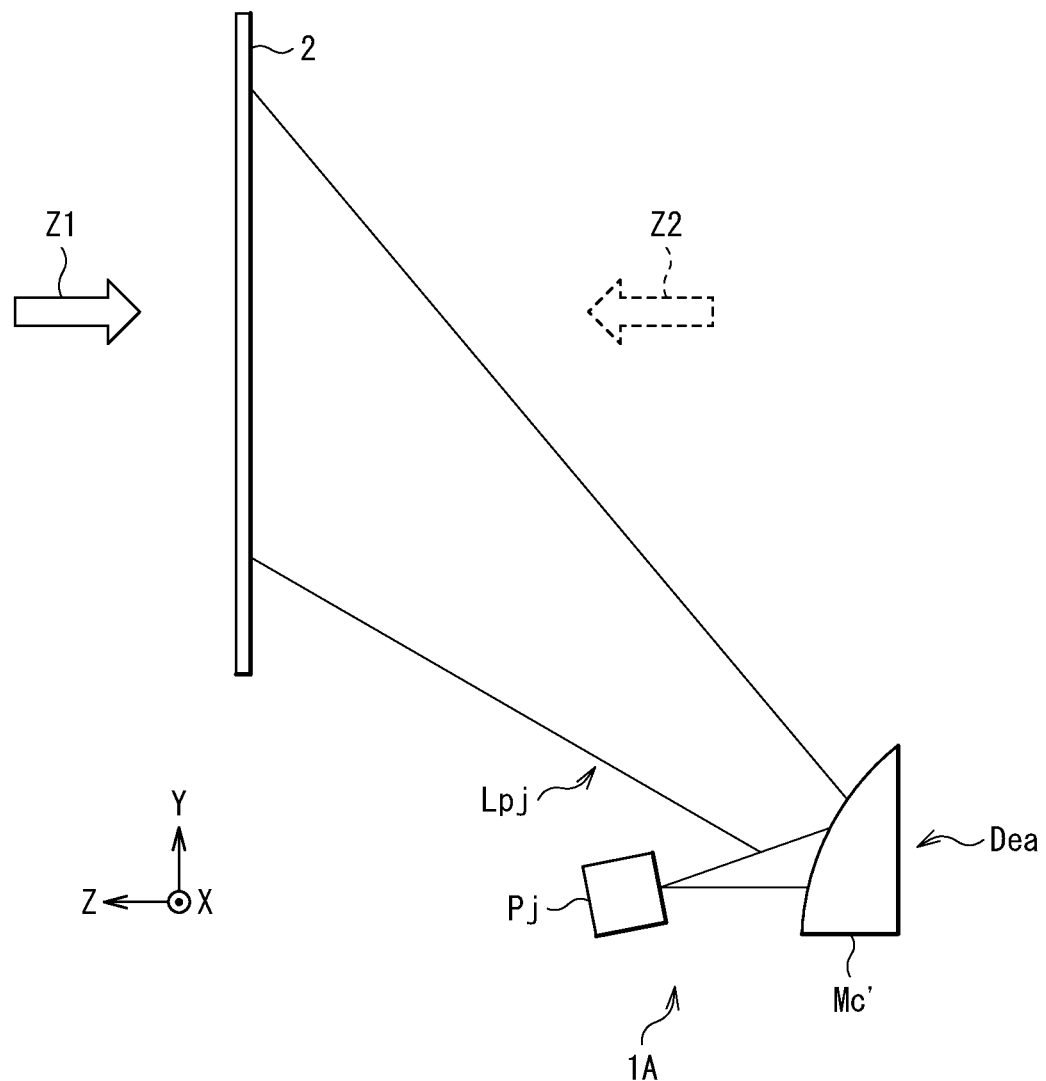

[FIG. 6]
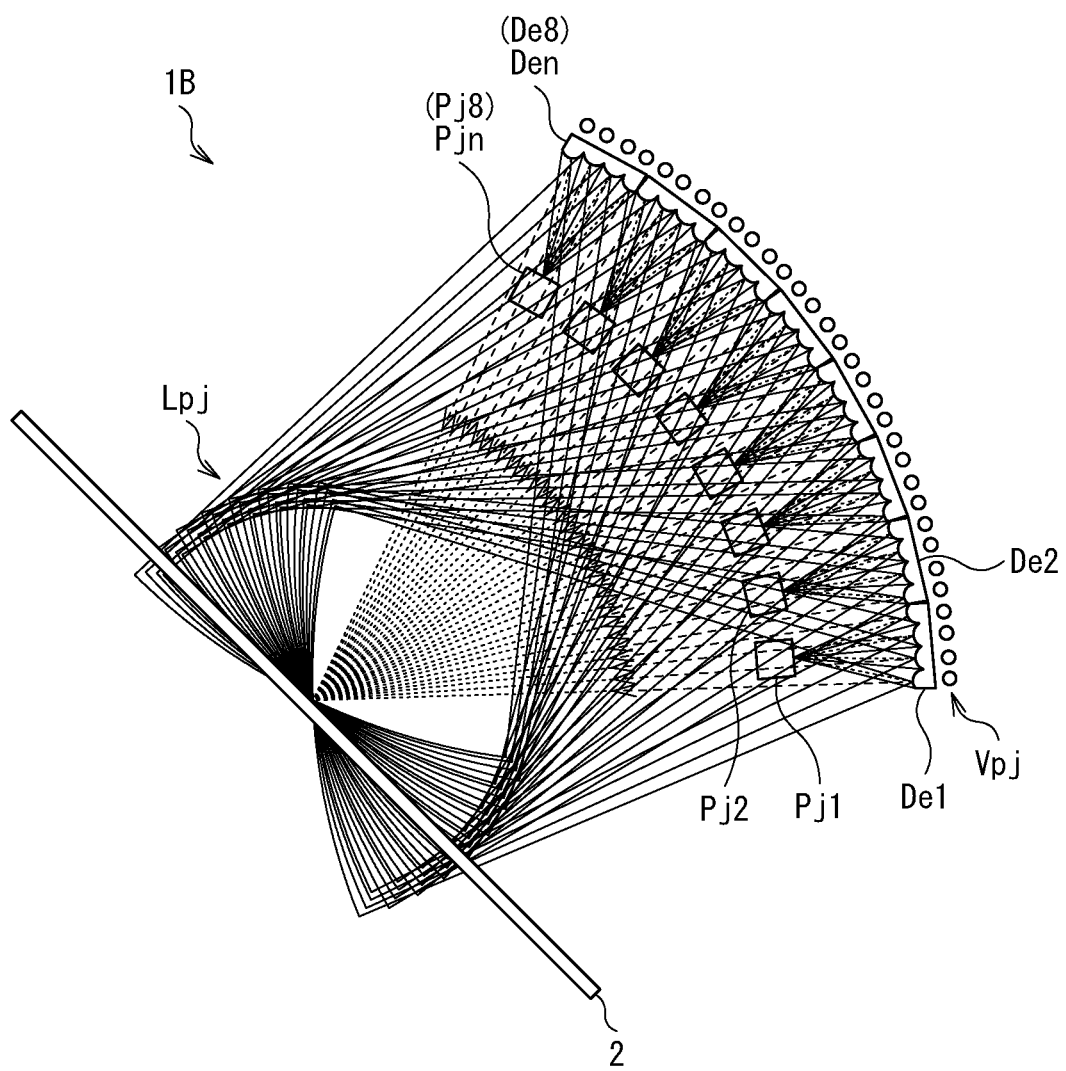

[ FIG. 7 ]
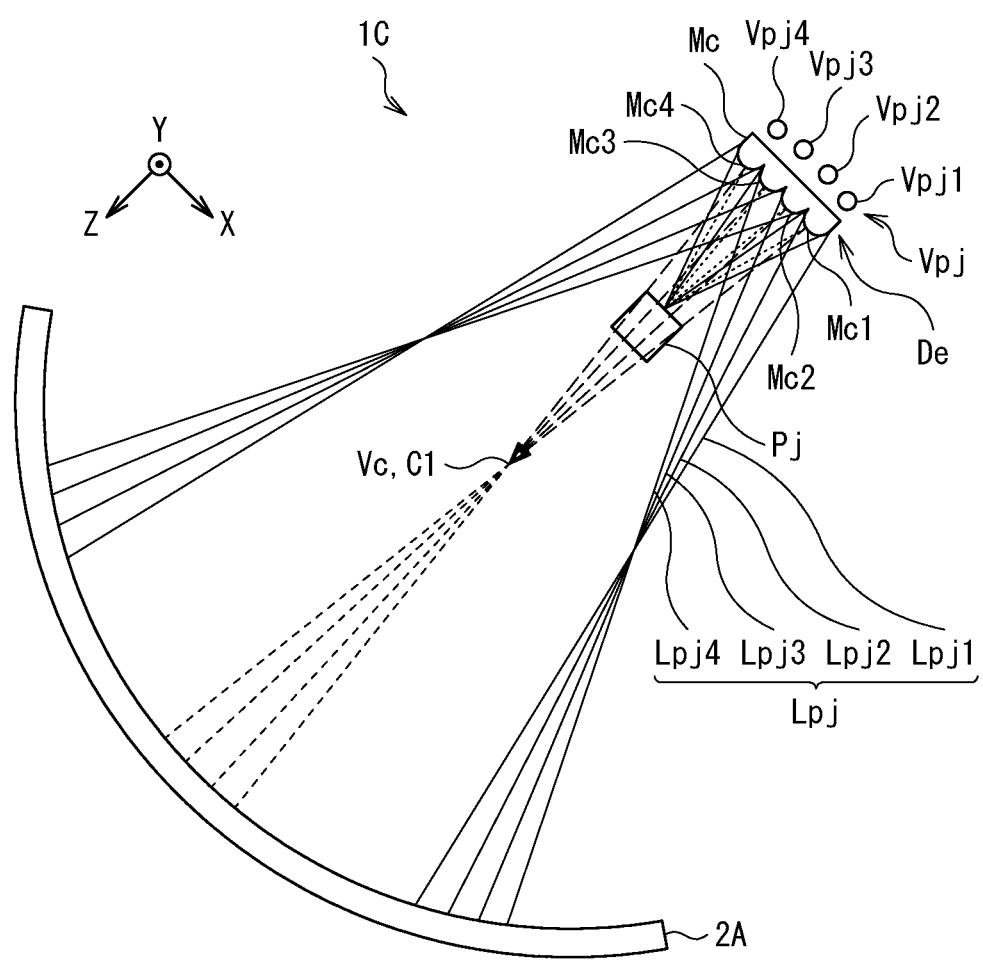

[ FIG. 8 ]
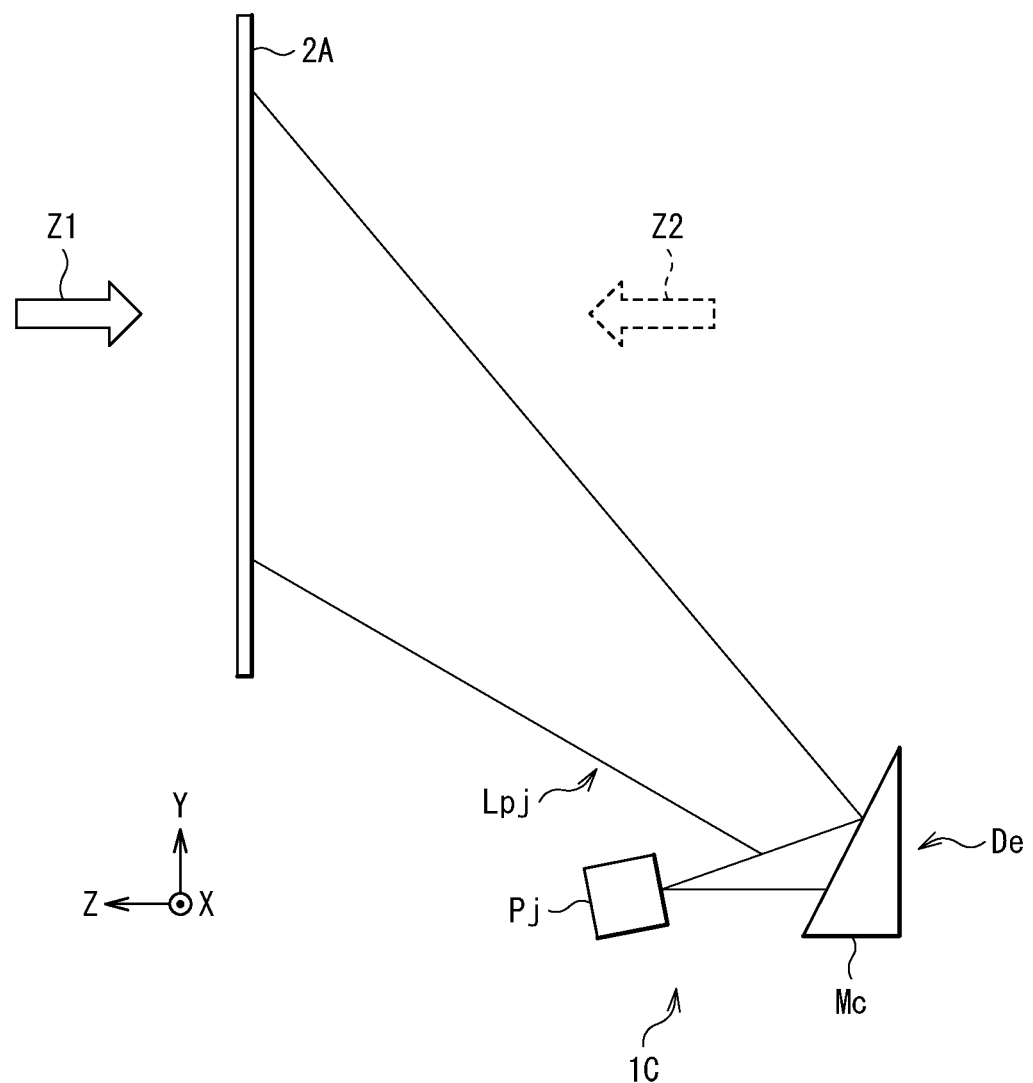

[ FIG.9 ]
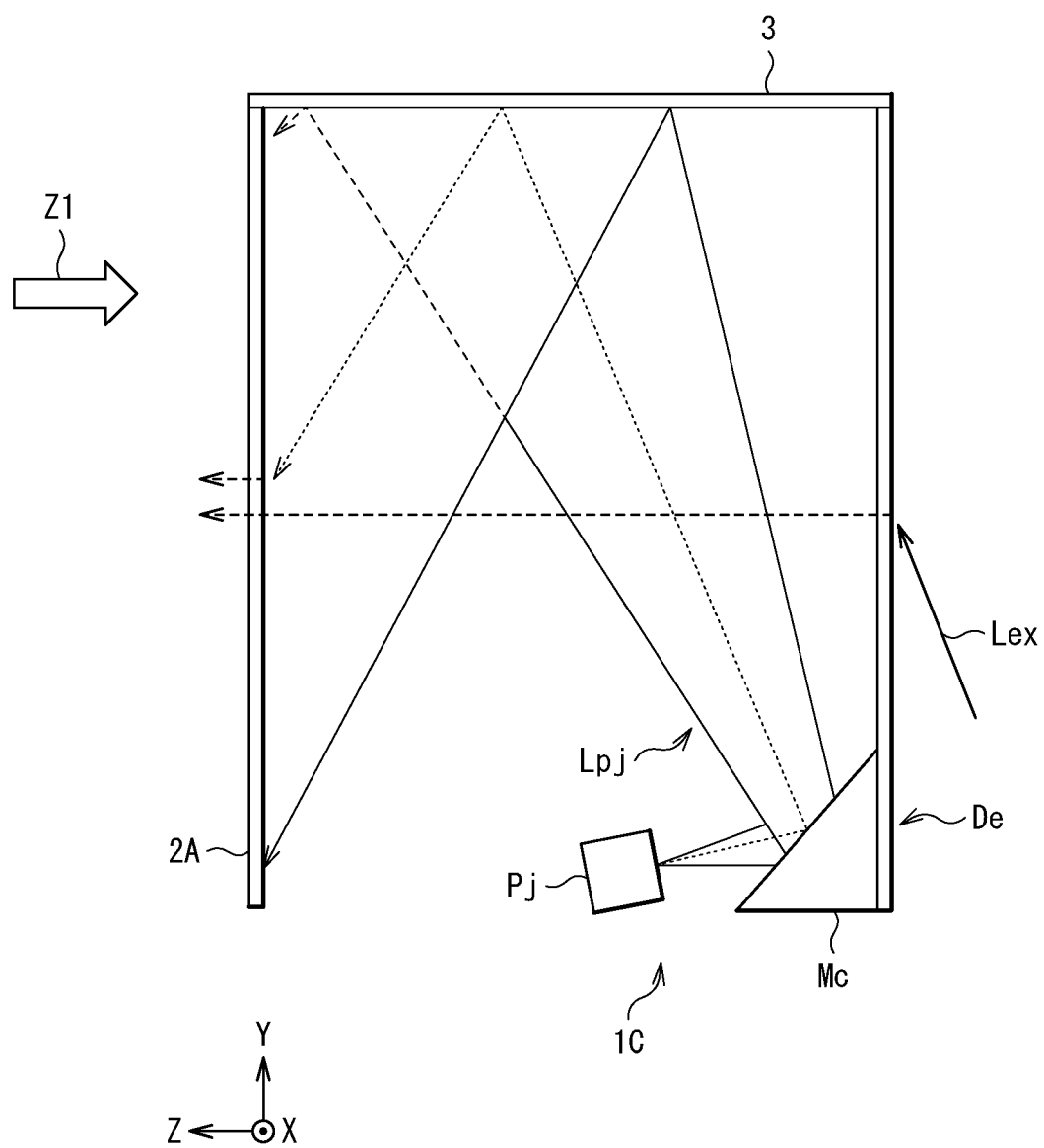

[ FIG. 10 ]
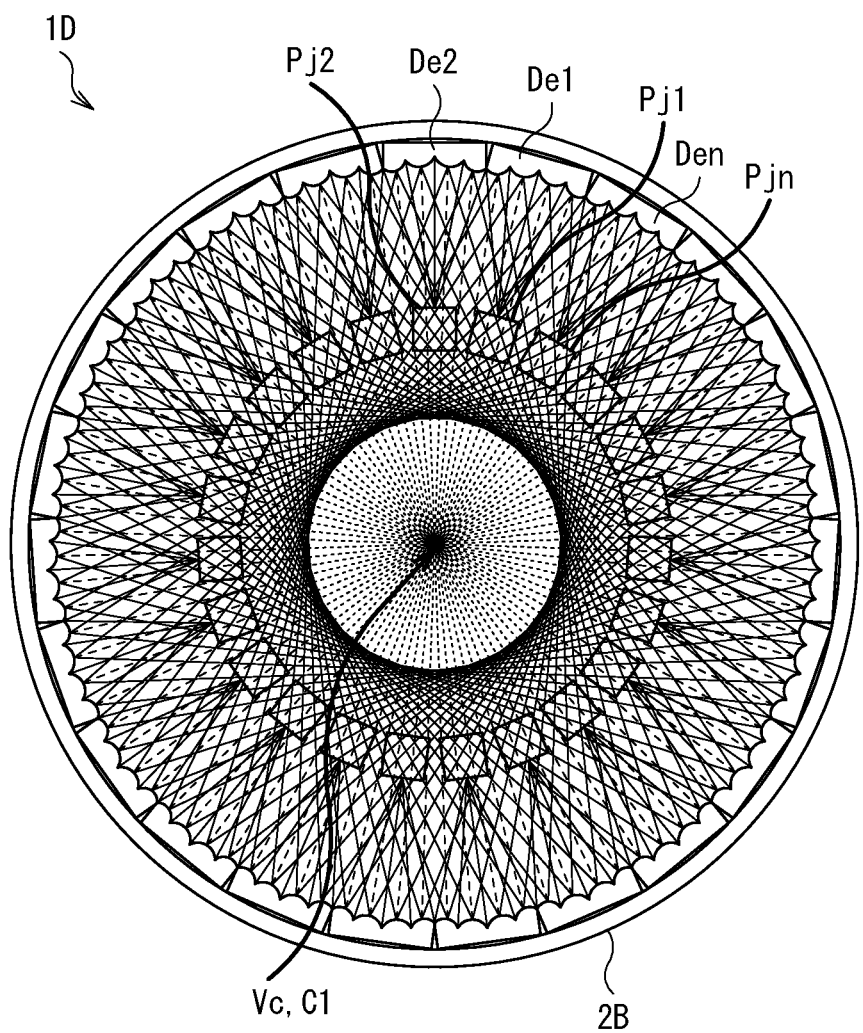

[ FIG. 11 ]
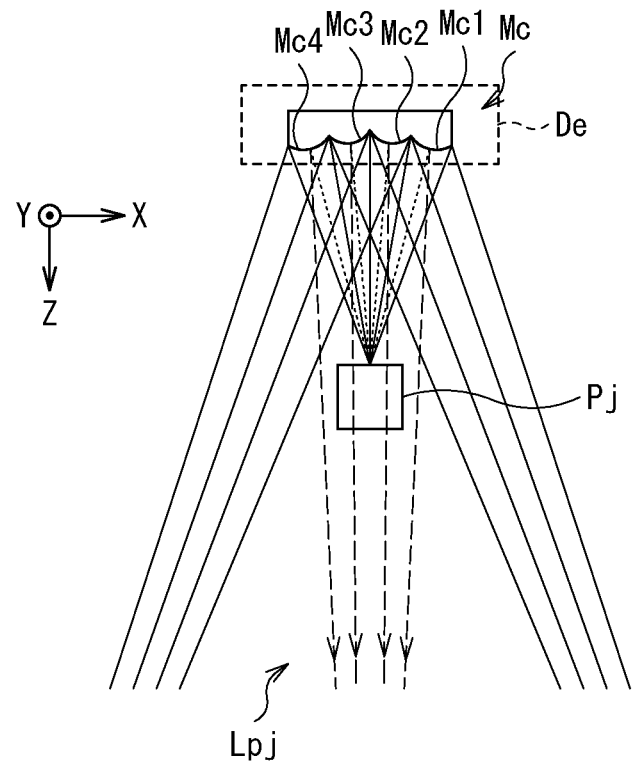
[ FIG. 12 ]
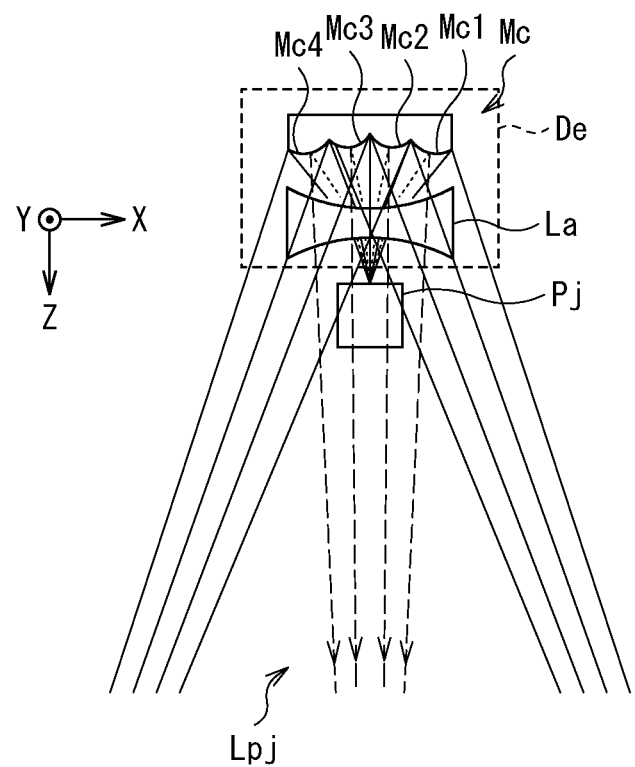

[ FIG. 13 ]
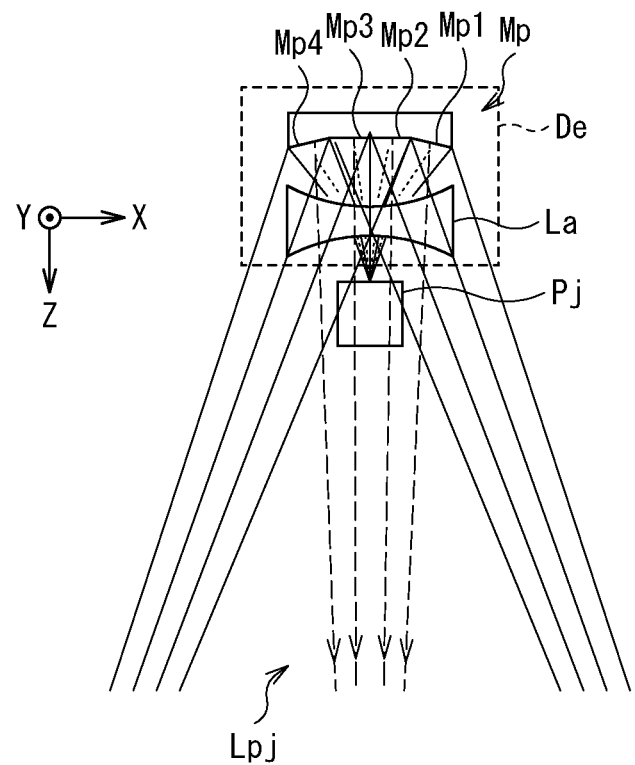
[ FIG. 14 ]
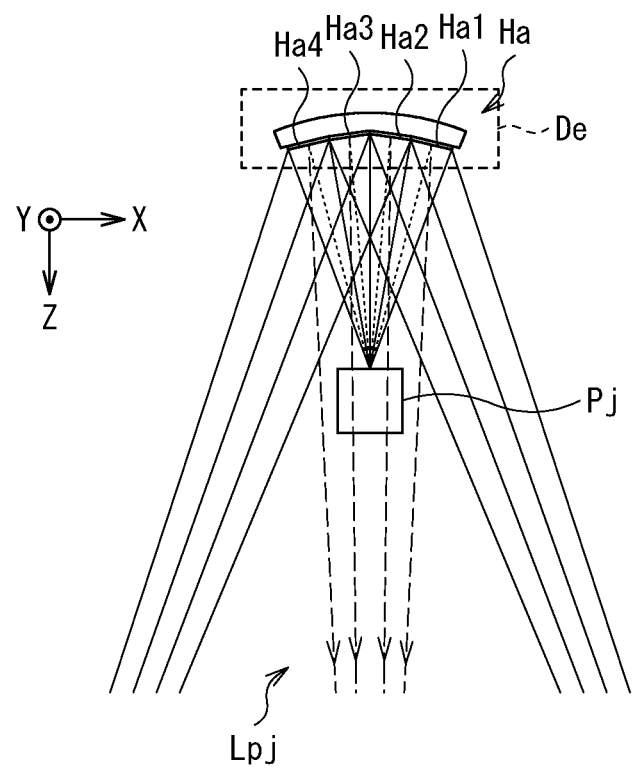

[ FIG. 15 ]
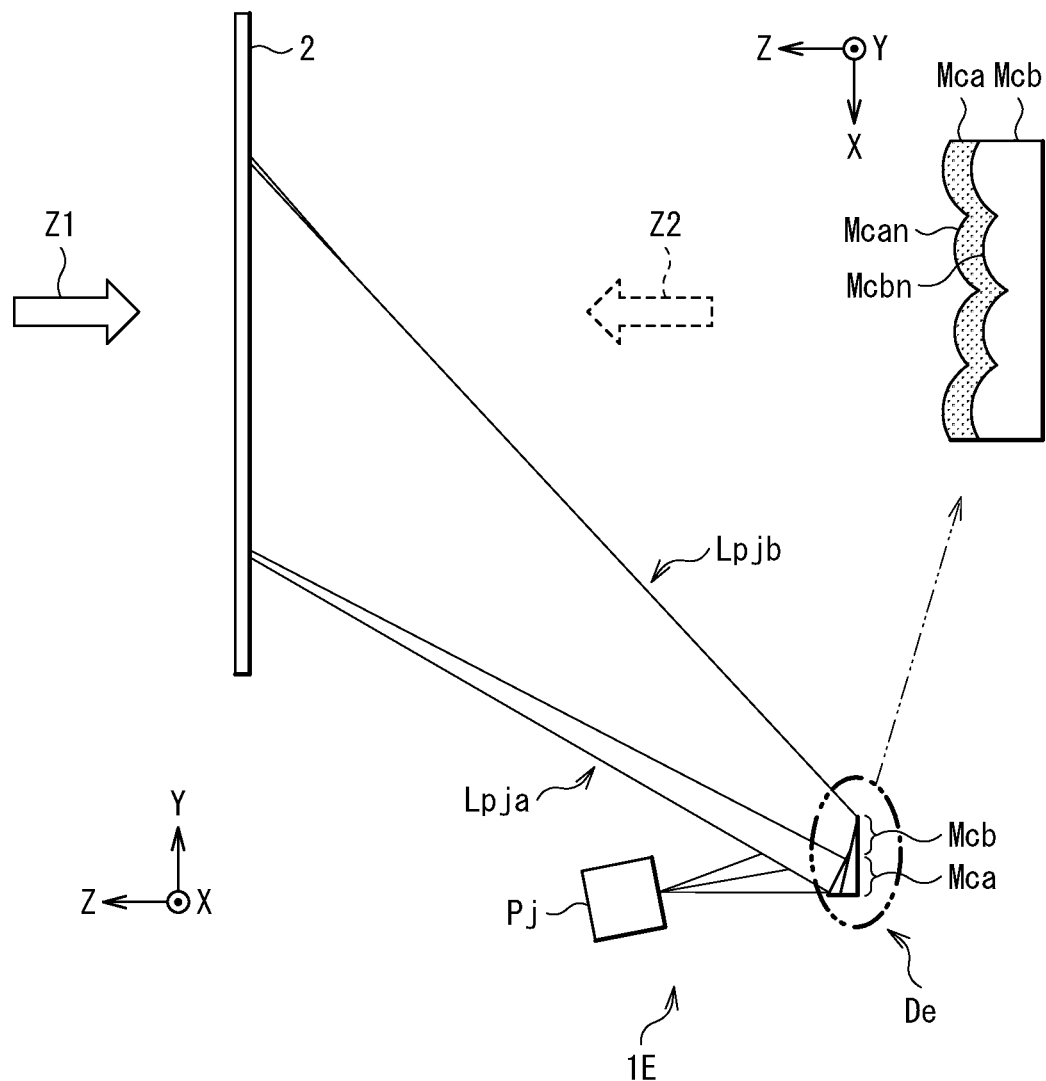

[ FIG. 16 ]
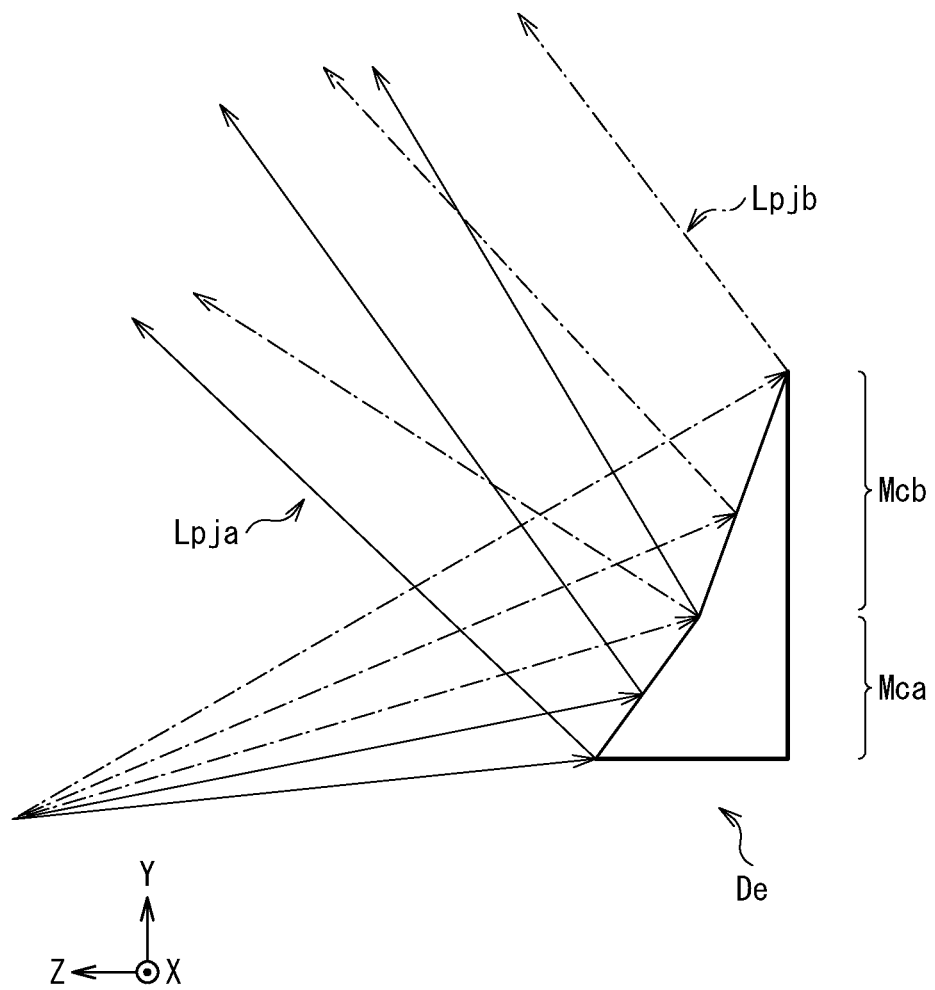

[ FIG. 17 ]
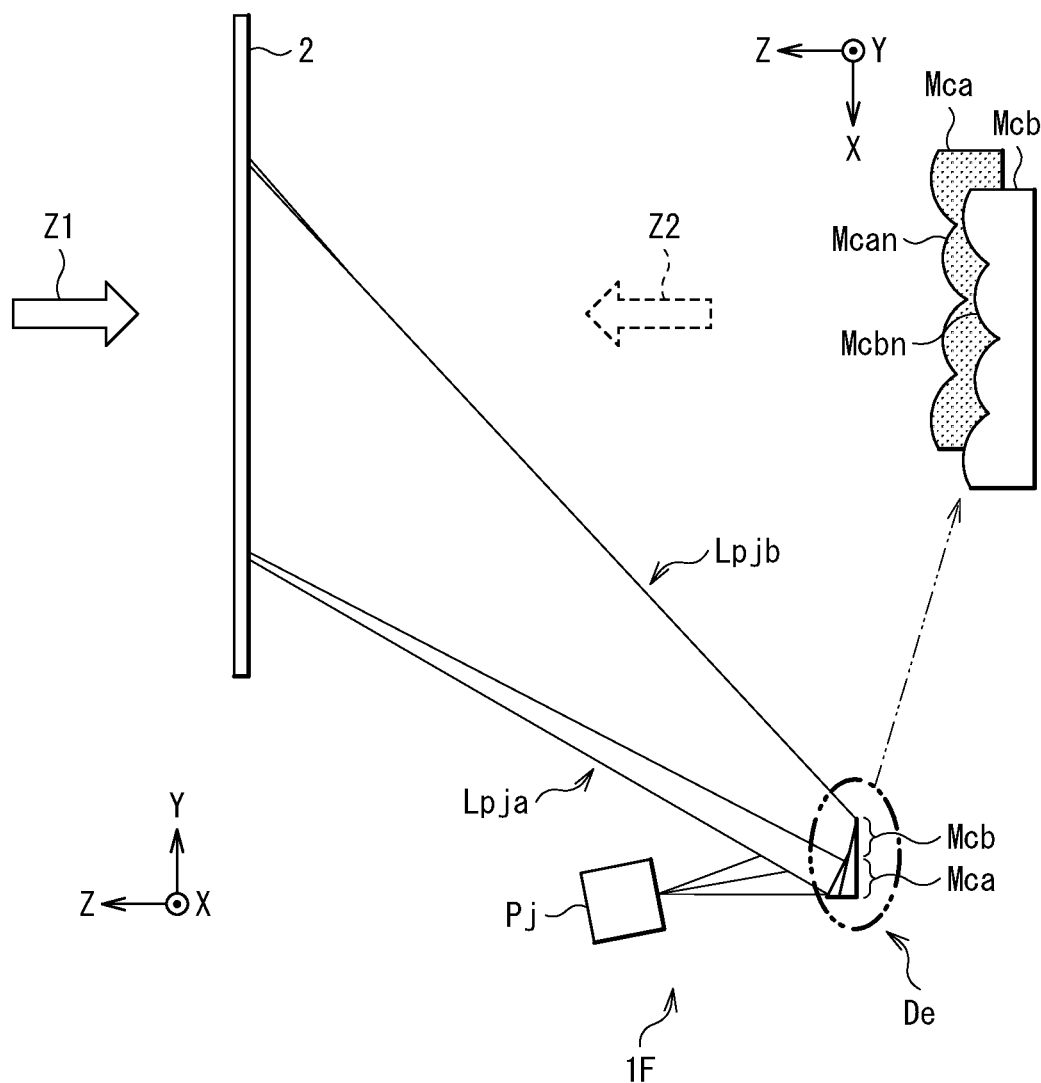

[ FIG. 18 ]
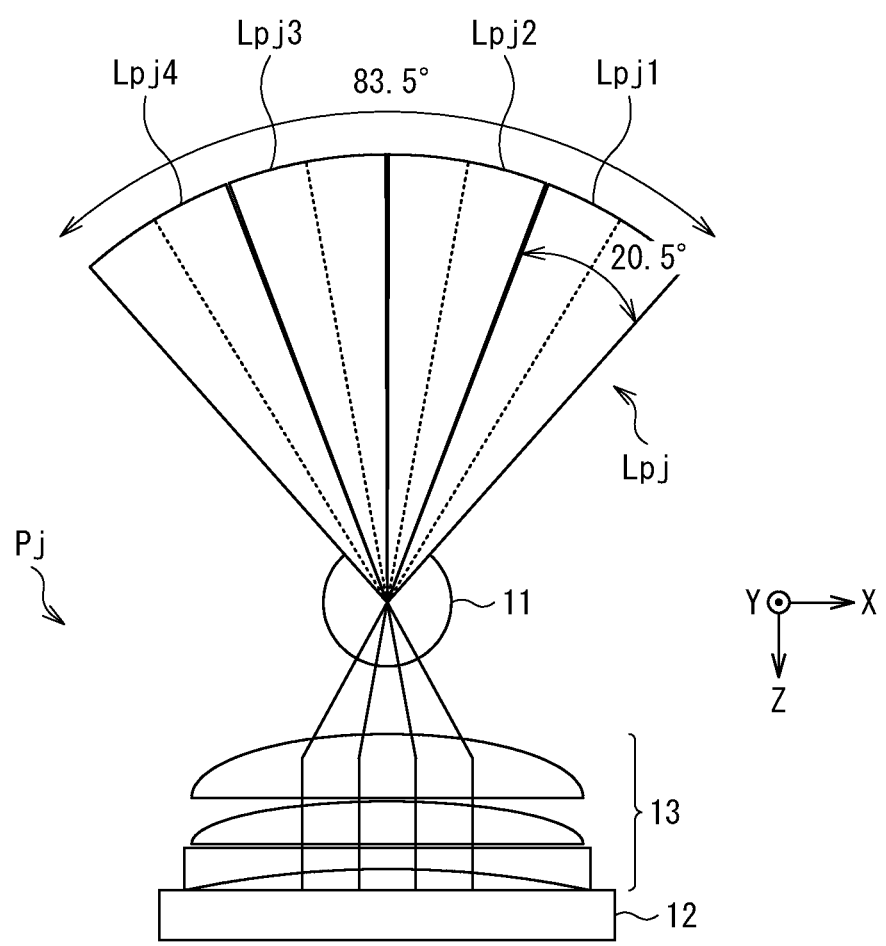

IMAGE DISPLAY DEVICE TO DISPLAY A PLURALITY OF VIEWPOINT IMAGES

CROSS REFERENCE TO RELATED APPLICATIONS

This application is a U.S. National Phase of International Patent Application No. PCT/JP2019/011136 filed on Mar. 18, 2019, which claims priority benefit of Japanese Patent Application No. JP 2018-083669 filed in the Japan Patent Office on Apr. 25, 2018. Each of the above-referenced applications is hereby incorporated herein by reference in its entirety.

TECHNICAL FIELD

The present disclosure relates to an image display device that displays a plurality of viewpoint images.

BACKGROUND ART

There is a technology to display a plurality of images viewed from respective different viewpoints (viewpoint images). For example, there is a technology to display a plurality of viewpoint images by independently scanning and deflecting a plurality of laser light beams emitted from a plurality of light emission points (see PTL 1). This brings, for example, a technology to display a three-dimensional image.

CITATION LIST

Patent Literature

PTL 1: Japanese Unexamined Patent Application Publication No. 2008-219618

SUMMARY OF THE INVENTION

The above-described technologies may need the same number of light sources, which emit a plurality of laser light beams, as the number of viewpoints, and a plurality of optical elements, such as lenses, that control states of the plurality of laser light beams. Furthermore, the viewpoint images are displayed through deflection with use of an array of small lenses; therefore, high position accuracy of lenses and lasers in a wide range is demanded to display a desired image in the right direction. This causes an increase in overall device size and an increase in cost.

It is desirable to provide an image display device that is small-sized and able to display a multi-view image at low cost.

An image display device according to an embodiment of the present disclosure includes one or more image sources that output a two-dimensional projection image; and one or more image deflection sections that generate a plurality of area images by dividing the projection image from the image source into a plurality of areas at least in a horizontal direction, and deflects and projects, toward a screen having anisotropic diffusion properties, the plurality of area images at respective angles different from each other to partially overlap the plurality of area images with each other on the screen and thereby display images from a plurality of viewpoints.

In the image display device according to the embodiment of the present disclosure, the image deflection section generates the plurality of area images by dividing the projection image from the image source into the plurality of areas at least in the horizontal direction. The image deflection section deflects and projects, toward the screen having anisotropic diffusion properties, the plurality of area images at respective angles different from each other to partially overlap the plurality of area images with each other on the screen and thereby display images from a plurality of viewpoints.

BRIEF DESCRIPTION OF DRAWING

FIG. 1 is a configuration diagram illustrating an overview of an image display device according to a comparative example.

FIG. 2 is a schematic top view of a configuration example of an image display device according to a first embodiment of the present disclosure.

FIG. 3 is a top view of an example of projection light from an image source in the image display device according to the first embodiment.

FIG. 4 is a schematic side view of a configuration example of the image display device according to the first embodiment.

FIG. 5 is a schematic side view of a first modification example of the image display device according to the first embodiment.

FIG. 6 is a schematic top view of a second modification example of the image display device according to the first embodiment.

FIG. 7 is a schematic top view of a configuration example of an image display device according to a second embodiment.

FIG. 8 is a schematic side of a configuration example of the image display device according to the second embodiment.

FIG. 9 is a schematic side view of a first modification example of the image display device according to the second embodiment.

FIG. 10 is a schematic top of a second modification example of the image display device according to the second embodiment.

FIG. 11 is a top view of a first configuration example of an image deflection section.

FIG. 12 is a top view of a second configuration example of the image deflection section.

FIG. 13 is a top view of a third configuration example of the image deflection section.

FIG. 14 is a top view of a fourth configuration example of the image deflection section.

FIG. 15 is a top view and a side view of a first configuration example of an image deflection section in an image display device according to a fourth embodiment.

FIG. 16 is an enlarged side view of the image deflection section illustrated in FIG. 15.

FIG. 17 is a top view and a side view of a second configuration example of the image deflection section in the image display device according to the fourth embodiment.

FIG. 18 is a top view of a configuration example of an image source in an image display device according to a fifth embodiment.

MODES FOR CARRYING OUT THE INVENTION

The following describes embodiments of the present disclosure in detail with reference to the accompanying drawings. It is to be noted that the description is given in the following order.

1. First Embodiment (Image Display Device Employing Flat Screen)
   1.0 Comparative Example (FIG. 1)
   1.1 Configuration and Operation of Image Display Device according to First Embodiment (FIGS. 2 to 6)
   1.2 Effects
2. Second Embodiment (Image Display Device Employing Cylindrical Screen) (FIGS. 7 to 10)
3. Third Embodiment (Variations of Image Deflection Section) (FIGS. 11 to 14)
4. Fourth Embodiment (Examples of Image Deflection Section Including Plurality of Stages of Arrays) (FIGS. 15 to 17)
5. Fifth Embodiment (Variation of Image Source) (FIG. 18)
6. Other Embodiments
1. First Embodiment 1.0 Comparative Example Overview and Issues of Image Display Device According to Comparative Example FIG. 1 illustrates an overview of an image display device according to a comparative example.

The image display device according to the comparative example includes a plurality of projectors 100, which serves as image sources, arranged in an array and displays a three-dimensional image by projecting images from the respective projectors 100 toward a screen 200 having anisotropic diffusion properties.

In the image display device according to the comparative example, one projector 100 outputs an image from one viewpoint. Accordingly, the same number of image sources (projectors 100) as the number of viewpoints is necessary to display a plurality of viewpoint images, which results in a large-scale device as a whole. In the image display device according to the comparative example, base points of the respective image sources are located on the perimeter of a circle. It is therefore difficult to reduce the size of the device as a whole even if the size of each of the projectors 100 is reduced.

1.1 Configuration and Operation of Image Display Device According to First Embodiment FIGS. 2 to 4 schematically illustrate a configuration example of an image display device 1 according to a first embodiment of the present disclosure. FIG. 2 illustrates an example of an overall configuration of the image display device 1 in a top view. FIG. 3 illustrates an example of a projection image (projection light) Lpj from an image source Pj in the image display device 1 in a top view. FIG. 4 schematically illustrates the configuration example of the image display device 1 in a side view. It is to be noted that X indicates a horizontal direction, Y indicates a vertical direction, and Z indicates a projection direction in FIGS. 2 to 4. The same applies to the drawings referred to in association with the other embodiments described below.

The image display device 1 according to the first embodiment includes the image source Pj that outputs the two-dimensional projection image Lpj, and an image deflection section De that deflects and projects, toward a screen 2, a plurality of area images Lpjn at respective angles different from each other. The plurality of area images Lpjn is obtained by dividing the projection image Lpj. The area images Lpjn correspond to respective viewpoint images from viewpoints different from each other.

Examples of the screen 2 include a flat transmissive or reflective screen having anisotropic diffusion properties that provides different light diffusion properties in the horizontal direction and in the vertical direction. The screen 2 includes, for example, an anisotropic diffusion plate. The screen 2 may include a diffractive element having anisotropic diffusion properties that provides different light diffusion properties in the horizontal direction and in the vertical direction. The diffractive element may include a holographic optical element (HOE). Desirably, the anisotropic diffusion properties of the screen 2 involve, for example, relatively narrow diffusion in the horizontal direction and relatively wide diffusion in the vertical direction. Narrow diffusion in the horizontal direction allows for suppression of unnecessary mixture of a plurality of viewpoint images projected from different angles.

It is to be noted that Z1 in FIG. 4 indicates an observation direction in a case where the screen 2 is a transmissive screen. Z2 indicates an observation direction in a case where the screen 2 is a reflective screen. The same applies to the drawings referred to in association with the other embodiments described below.

The image source Pj generates the two-dimensional projection image Lpj by emitting a light beam temporally or spatially two-dimensionally. The image source Pj is disposed between the screen 2 and the image deflection section De.

The image source Pj may include, for example, a projector of LCOS (Liquid Crystal On Silicon) type, which generates the projection image Lpj with use of a reflective liquid crystal element (a reflective liquid crystal projector). In this case, the image source Pj generates the two-dimensional projection image Lpj by emitting a light beam spatially two-dimensionally.

Alternatively, the image source Pj may include, for example, a projector that generates the projection image Lpj with use of a plurality of movable mirrors arranged two-dimensionally. For example, the image source Pj may include an MEMS (Micro Electro Mechanical System) projector of DMD (Digital Micromirror Device) type. In this case, the image source Pj generates the two-dimensional projection image Lpj by emitting a light beam spatially two-dimensionally.

Alternatively, the image source Pj may include a scanning projector that generates the projection image Lpj with use of a single scanning mirror. For example, the image source Pj may include an MEMS projector of single mirror type that generates the two-dimensional projection image Lpj by two-dimensionally scanning laser light from a single laser light source with use of a single scanning mirror. In this case, the image source Pj generates the two-dimensional projection image Lpj by emitting a light beam temporally two-dimensionally.

The image deflection section De generates the plurality of area images Lpjn by dividing the projection image Lpj from the image source Pj into a plurality of areas at least in the horizontal direction. The image deflection section De deflects and projects, toward the screen 2, the plurality of area images Lpjn at respective angles different from each other to display images from a plurality of viewpoints by partially overlapping the area images Lpjn with one another on the screen 2, thereby. Thus, a three-dimensional image, for example, is displayed. The image deflection section De deflects and projects, toward the screen 2, the plurality of area images Lpjn at respective angles different from each other in a magnified manner.

The image deflection section De includes a curved mirror array Mc having a plurality of curved mirrors Mcn arranged in the horizontal direction. Each of the plurality of curved mirrors Mcn has a curved shape (a convex mirror) at least in the horizontal direction. FIG. 2 illustrates an example in which the curved mirrors Mcn have a convex shape. However, the curved mirrors Mcn may have a concave shape (a concave mirror).

FIG. 2 illustrates an example in which the curved mirror array Mc in the image deflection section De has four curved mirrors Mc1, Mc2, Mc3, and Mc4, and four area images Lpj1, Lpj2, Lpj3, and Lpj4 are generated by dividing one projection image Lpj in the horizontal direction. However, the number of area images Lpjn to be generated from one projection image Lpj is not limited to four, and may be five or more, or two or three. It is sufficient if the same number of curved mirrors Mcn included in the curved mirror array Mc as the number of area images Lpjn (viewpoint images) to be generated are provided.

The image source Pj outputs, for example, the projection image Lpj in a range of 41.5° in the horizontal direction as illustrated in FIG. 3. The four area images Lpj1, Lpj2, Lpj3, and Lpj4 obtained by dividing the projection image Lpj into areas by 10° in the horizontal direction, for example, enter the image deflection section De. In the image deflection section De, the four area images Lpj1, Lpj2, Lpj3, and Lpj4 respectively enter the four curved mirrors Mc1, Mc2, Mc3, and Mc4. The four curved mirrors Mc1, Mc2, Mc3, and Mc4 respectively deflect and project, toward the screen 2, the four area images Lpj1, Lpj2, Lpj3, and Lpj4 by reflecting the four area images Lpj1, Lpj2, Lpj3, and Lpj4 at respective angles different from each other in a magnified manner. The curved mirrors Mc1, Mc2, Mc3, and Mc4 project, for example, the four area images Lpj1, Lpj2, Lpj3, and Lpj4 at angles different by 2° in the horizontal direction on the screen 2. This makes it possible to display four viewpoint images from viewing positions different by 2° in the horizontal direction.

Furthermore, the image deflection section De desirably deflects and projects each of the plurality of area images Lpjn to cause image center light beams Vc of the respective area images Lpjn to coincide with one another on the screen 2 as illustrated in FIG. 3.

Furthermore, as illustrated in FIG. 4, the image source Pj and the image deflection section De are disposed below the screen 2, for example. Thus, the plurality of area images Lpjn is projected upward toward the screen 2.

In order to perform upward projection from lower side toward the screen 2, the curved mirror array Mc in the image deflection section De is inclined with respect to the screen 2 at an angle corresponding to an angle of the upward projection. Furthermore, each of the plurality of curved mirrors Mcn in the curved mirror array Mc has a planar shape in the vertical direction.

It is to be noted that the values of the angle by which the projection image Lpj is divided and the deflection angles of the area images Lpj1, Lpj2, Lpj3, and Lpj4 on the screen 2 described above are merely examples, and these angles are not limited to the values described above.

Modification Examples

First Modification Example

FIG. 5 illustrates an example of an overall configuration of a first modification example of the image display device 1 in a side view.

An image display device 1A according to the first modification example includes an image deflection section Dea (curved mirror array Mc') instead of the image deflection section De (curved mirror array Mc) in the image display device 1 illustrated in FIG. 4.

FIG. 4 illustrates an example in which each of the plurality of curved mirrors Mcn in the curved mirror array Mc has a planar shape in the vertical direction. However, each of the plurality of curved mirrors Mcn may have a curved shape also in the vertical direction as in the curved mirror array Mc' illustrated in FIG. 5. The plurality of curved mirrors Mcn having a curved shape also in the vertical direction allows the area images Lpjn to be projected in a magnified manner also in the vertical direction.

Second Modification Example

FIG. 6 illustrates an example of an overall configuration of a second modification example of the image display device 1 according to the first embodiment in a top view.

An image display device 1B according to the second modification example includes a plurality of image display units as sets each including one image source Pj and one image deflection section De included in the image display device 1 illustrated in FIG. 2. Thus, the image display device 1B has a configuration including a plurality of image sources Pj1, Pj2, . . . , and Pjn, and a plurality of image deflection sections De1, De2, . . . , and Den.

The plurality of image sources Pj1, Pj2, . . . , and Pjn and the plurality of image deflection sections De1, De2, . . . , and Den are arranged in parallel in the horizontal direction, thereby making it possible to increase the number of viewpoints and widen a viewing range for a three-dimensional image, for example. FIG. 6 illustrates a configuration example in which eight image sources Pj1, Pj2, . . . , and Pj8, and eight image deflection sections De1, De2, . . . , and Deb are arranged. For example, in a case where four viewpoint images from viewing positions different by 2° in the horizontal direction are displayed by a set of one image source Pj and one image deflection section De, according to the configuration example illustrated in FIG. 6, it is possible to display 4×8=32 viewpoint images. It is also possible to obtain a viewing range width of 2° (pitch)×32 (viewpoints)= 64°.

1.2 Effects

According to the present embodiment, as described above, images from a plurality of viewpoints are displayed by dividing the projection image Lpj from the single image source Pj into the plurality of area images Lpjn, and deflecting and projecting, toward the screen 2, the plurality of area images Lpjn at respective angles different from each other, which makes it possible to display a multi-view image at low cost with a small-sized configuration.

According to the configuration example illustrated in FIG. 2, one projection image Lpj is divided into the four area images Lpj1, Lpj2, Lpj3, and Lpj4, and these area images Lpj are deflected and projected by being reflected at different respective angles different from each other in a magnified manner by the curved mirrors Mcn corresponding to the respective area images Lpjn. It is therefore possible to perform the projection in a manner as if there were four virtual image sources Vpj (Vpj1, Vpj2, Vpj3, and Vpj4). This allows for reduction of the number of light sources (image sources) necessary for displaying images from a plurality of viewpoints, as compared with the image display device according to the comparative example illustrated in FIG. 1. Furthermore, the present embodiment has a structure that causes the projection image Lpj from the image source Pj to turn at the image deflection section De into an opposite direction toward the screen 2, thereby allowing the virtual image sources Vpj to be located outside of the image deflection section De with respect to the screen 2. It is therefore possible to reduce the size of the image display device including the screen 2, as compared with a case where image sources Pj are actually disposed in positions of the virtual image sources Vpj.

It is to be noted that the effects described herein are merely exemplary and not limiting, and the present disclosure may exert other effects. The same applies to effects of the other embodiments described below.

2. Second Embodiment

Next, an image display device according to a second embodiment of the present disclosure is described. It is to be noted that in the following description, constituent elements that are substantially the same as those of the image display device according to the first embodiment described above are indicated by the same reference signs, and description thereof is omitted as appropriate.

FIGS. 7 and 8 illustrate a configuration example of an image display device 1C according to the second embodiment. FIG. 7 illustrates an example of an overall configuration of the image display device 1C in a top view. FIG. 8 schematically illustrates the configuration example of the image display device 1C in a side view.

In the image display device 1 according to the first embodiment (FIGS. 2 and 4), the configuration example employing the flat screen 2 is illustrated. By contrast, the image display device 1C according to the second embodiment has a configuration employing a cylindrical screen 2A.

The cylindrical screen 2A is a substantially semi-cylindrical transmissive or reflective screen having anisotropic diffusion properties that provides different light diffusion properties in the horizontal direction and in the vertical direction. The cylindrical screen 2A includes, for example, an anisotropic diffusion plate. The cylindrical screen 2A may include a diffractive element having anisotropic diffusion properties that provides different light diffusion properties in the horizontal direction and in the vertical direction. The diffractive element may include an HOE. Desirably, the anisotropic diffusion properties of the cylindrical screen 2A involve, for example, relatively narrow diffusion in the horizontal direction and relatively wide diffusion in the vertical direction. Narrow diffusion in the horizontal direction allows for suppression of unnecessary mixture of a plurality of viewpoint images projected from different angles.

Desirably, in the image display device 1C according to the second embodiment, each of the plurality of area images Lpjn is deflected and projected to cause the image center light beams Vc of the respective area images Lpjn to pass through a cylindrical axis C1 of the cylindrical screen 2A. As a result, the image center light beams Vc of the plurality of respective area images Lpjn are deflected and projected on a projection surface (cylindrical surface) of the cylindrical screen 2A in a state in which the image center light beams Vc are slightly shifted by the same angle. Accordingly, the area images Lpjn are deflected and projected on the cylindrical surface of the cylindrical screen 2A to be overlapped with one another in a state in which the area images Lpjn are slightly shifted by the same shift angle.

Other configurations, operations, and effects may be substantially similar to those of the image display device according to the first embodiment described above.

Modification Examples

First Modification Example

FIG. 9 schematically illustrates a first modification example of the image display device 1C according to the second embodiment in a side view.

As illustrated in FIG. 9, a reflecting mirror 3 may be provided above the cylindrical screen 2A, and the plurality of area images Lpjn from the image deflection section De may be projected in a downward direction from the reflecting mirror 3 onto the cylindrical screen 2A after being once reflected by the reflecting mirror 3 at a higher location.

In a case where the cylindrical screen 2A includes a transmissive HOE, in particular, an influence of external light Lex from a screen surface on an opposite side to the observation direction Z1 poses an issue. In a case where the screen 2A includes an HOE, the plurality of area images Lpjn is projected upward to be reflected by the reflecting mirror 3 once, and then projected downward onto the screen 2A as illustrated in FIG. 9, thereby making it possible to impede the external light Lex itself from entering, and thus reduce the influence of the external light Lex. This improves external light resistance.

Second Modification Example

FIG. 10 illustrates an example of an overall configuration of a second modification example of the image display device 1C according to the second embodiment in a top view.

An image display device 1D according to the second modification example has a configuration that includes a plurality of image display units as sets each including one image source Pj and one image deflection section De included in the image display device 1C illustrated in FIG. 7. Thus, the image display device 1D has a configuration including a plurality of image sources Pj1, Pj2, . . . , and Pjn, and a plurality of image deflection sections De1, De2, . . . , and Den.

In the image display device 1D according to the second modification example, the plurality of area images Lpjn is projected toward a completely cylindrical screen 2B having a 360° projection surface. The plurality of image sources Pj1, Pj2, . . . , and Pjn and the plurality of image deflection sections De1, De2, . . . , and Den are arranged is arranged annularly to project the plurality of area images Lpjn onto the 360° cylindrical screen 2B. This provides a 360° multi-view image.

3. Third Embodiment

Next, an image display device according to a third embodiment of the present disclosure is described. It is to be noted that in the following description, constituent elements that are substantially the same as those of the image display device according to the first or second embodiment described above are indicated by the same reference signs, and description thereof is omitted as appropriate.

The image deflection section De in the image display devices according to the first and second embodiments described above may have any of configurations illustrated in FIGS. 11 to 14.

First Configuration Example

FIG. 11 illustrates a first configuration example of the image deflection section De in a top view.

The image deflection section De may include the curved mirror array Mc having the plurality of curved mirrors Mcn arranged in the horizontal direction. Each of the plurality of curved mirrors Mcn has a curved shape at least in the horizontal direction. FIG. 11 illustrates an example in which the curved mirrors Mcn have a convex shape in the horizontal direction (convex mirrors). However, the curved mirrors Mcn may have a concave shape in the horizontal direction (concave mirrors). The concave mirrors obtain a higher magnification more easily. FIG. 11 illustrates an example in which the curved mirror array Mc in the image deflection section De has the four curved mirrors Mc1, Mc2, Mc3, and Mc4. However, the number of curved mirrors Mcn is not limited to four, and may be five or more, or two or three. It is sufficient if the same number of curved mirrors Mcn included in the curved mirror array Mc as the number of area images Lpjn (viewpoint images) to be generated are provided. Furthermore, the curved mirror array Mc may have a planar shape (see FIG. 4) in the vertical direction, or may have a curved shape (see FIG. 5) in the vertical direction in a case where projection is performed in a magnified manner in the vertical direction.

Second Configuration Example

FIG. 12 illustrates a second configuration example of the image deflection section De in a top view.

The image deflection section De may have a configuration including the curved mirror array Mc and a magnifying lens La. The curved mirror array Mc may have a substantially similar configuration to that illustrated in FIG. 11. The magnifying lens La is disposed between the image source Pj and the curved mirror array Mc. The magnifying lens La has a function of magnifying light at least in the horizontal direction. A configuration may be employed in which the projection image Lpj from the image source Pj is caused to be enter the curved mirror array Mc after being magnified by the magnifying lens La.

Third Configuration Example

FIG. 13 illustrates a third configuration of the image deflection section De in a top view.

The image deflection section De may have a configuration including a planar mirror array Mp and the magnifying lens La. The planar mirror array Mp has a plurality of planar mirrors Mpn arranged in the horizontal direction. Each of the plurality of planar mirrors Mpn has a planar shape at least in the horizontal direction. The planar mirror array Mp does not have a magnifying function in the horizontal direction but does have a deflecting function. The plurality of planar mirrors Mpn is disposed at respective angles different from each other to deflect and project the plurality of area images Lpjn in respective directions different from each other. In a case of this configuration, the magnifying lens La bears the horizontally magnifying function of the image deflection section De. FIG. 13 illustrates an example in which the planar mirror array Mp in the image deflection section De has four planar mirrors Mp1, Mp2, Mp3, and Mp4. However, the number of planar mirrors Mpn is not limited to four, and may be five or more, or two or three. It is sufficient if the same number of planar mirrors Mpn included in the planar mirror array Mp as the number of area images Lpjn (viewpoint images) to be generated is provided.

Fourth Configuration Example

FIG. 14 illustrates a fourth configuration of the image deflection section De in a top view.

The image deflection section De may have a configuration including a diffractive element array Ha having a plurality of diffraction regions Han arranged in the horizontal direction. Each of the plurality of diffraction regions Han has a magnifying function and a deflecting function at least in the horizontal direction. FIG. 14 illustrates an example in which the diffraction regions Han in the image deflection section De include four diffraction regions Ha1, Ha2, Ha3, and Ha4. However, the number of diffraction regions Han is not limited to four, and may be five or more, or two or three. It is sufficient if the same number of diffraction regions Han in the diffractive element array Ha as the number of area images Lpjn (viewpoint images) to be generated is provided. Furthermore, the diffractive element array Ha may have a configuration that does not have a magnifying function in the vertical direction or a configuration that have a magnifying function in the vertical direction.

Furthermore, the image deflection section De may have a configuration including the magnifying lens La in addition to the diffractive element array Ha as in the configuration example illustrated in FIG. 12. Furthermore, although FIG. 14 illustrates a configuration example in which the plurality of diffraction regions Han is included in a reflective diffractive element array Ha having a reflecting function, the plurality of diffraction regions Han may be included in a transmissive diffractive element array having a transmitting function. In a case where a transmissive diffractive element array is used in the image deflection section De, the projection direction of the plurality of area images Lpjn and the position of the screen 2 or the like are opposite (toward or on an upper side of FIG. 14) to those in the above-described configuration examples.

Other configurations, operations, and effects may be substantially similar to those of the image display device according to the first or second embodiment described above.

4. Fourth Embodiment

Next, an image display device according to a fourth embodiment of the present disclosure is described. It is to be noted that in the following description, constituent elements that are substantially the same as those of the image display device according to any of the first to third embodiments described above are indicated by the same reference signs, and description thereof is omitted as appropriate.

The image deflection section De in the first to third embodiments described above has a single-stage array configuration including a single curved mirror array Mc or the like in the vertical direction, but may have a multi-stage array configuration including a plurality of arrays arranged in the vertical direction. Arranging a plurality of arrays in the vertical direction expands a viewing range in the vertical direction and increases the number of viewpoints in the vertical direction (see FIGS. 15 and 16). Furthermore, it is possible to increase the number of viewpoints also in the horizontal direction and improve resolution in the horizontal direction (see FIG. 17).

The following describes configuration examples illustrated in FIGS. 15 to 17 in which two stages of curved mirror arrays Mc are arranged in the vertical direction. However, the array configuration may include three or more stages of arrays arranged in the vertical direction. Furthermore, in the illustrated examples, the plurality of curved mirrors Mcn in the curved mirror arrays Mc has a convex shape in the horizontal direction (convex mirrors). However, the curved mirrors Mcn may have a concave shape in the horizontal direction (concave mirrors). Alternatively, the array configuration may include, instead of the curved mirror arrays Mc, a plurality of stages of planar mirror arrays Mp (see FIG. 13) or diffractive element arrays Ha (see FIG. 14) arranged in the vertical direction. Furthermore, one of the curved mirror arrays Mc has a planar shape in the vertical direction in the configuration examples described below, but may have a curved shape also in the vertical direction (see FIG. 5).

First Configuration Example

FIG. 15 illustrates a configuration of an image display device 1E according to a first configuration example of the fourth embodiment in a top view and a side view. FIG. 16 is an enlarged side view of the image deflection section De illustrated in FIG. 15.

The image deflection section De in the image display device 1E according to the first configuration example has two curved mirror arrays Mca and Mcb arranged in different positions in the vertical direction. As illustrated in the top view in an upper right portion of FIG. 15, the curved mirror array Mca has a plurality of curved mirrors Mcan arranged in the horizontal direction. Likewise, the curved mirror array Mcb has a plurality of curved mirrors Mcab arranged in the horizontal direction. In this arrangement, each of the plurality of curved mirrors Mcan in the curved mirror array Mca and a corresponding one of the plurality of curved mirrors Mcbn in the curved mirror array Mcb are disposed at the same positions as each other in the horizontal direction as illustrated in the top view in the upper right portion of FIG. 15. In a case where the curved mirror arrays Mca and Mcb are inclined, a range of the projection image Lpj projected on each of the curved mirrors Mcan and Mcbn has a fan-like projection shape. Accordingly, in consideration of such fan-out, the upper curved mirrors Mcbn may be larger than the lower curved mirrors Mcan. In this case, horizontal occupation by the upper curved mirrors Mcbn increases, and accordingly the positions thereof may differ from those of the lower curved mirrors Mcan in the horizontal direction by a ratio of the increase (it is sufficient if angular positions relative to a projection angle of view coincide with each other).

The two curved mirror arrays Mca and Mcb may be inclined at inclination angles different from each other in the vertical direction. As a result, deflection angles of a projection image (projection light) Lpja to be deflected and projected by the curved mirror array Mca and a deflection angle of a projection image (projection light) Lpjb to be deflected and projected by the curved mirror array Mcb are made different from each other, and thus it is possible to expand the viewing range in the vertical direction.

Second Configuration Example

FIG. 17 illustrates a configuration of an image display device 1F according to a second configuration example of the fourth embodiment in a top view and a side view.

As in the image display device 1E according to the first configuration example, the image deflection section De in the image display device 1F according to the second configuration example has the two curved mirror arrays Mca and Mcb arranged at different positions in the vertical direction. The image display device 1F according to the second configuration example is different from the image display device 1E according to the first configuration example in positions of the two curved mirror arrays Mca and Mcb in the horizontal direction. The image display device 1F according to the second configuration example employs an arrangement in which each of the plurality of curved mirrors Mcan in the curved mirror array Mca and a corresponding one of the plurality of curved mirrors Mcbn in the curved mirror array Mcb are disposed at different positions (are staggered) in the horizontal direction as illustrated in the top view in an upper right portion of FIG. 17. This increases the number of viewpoints also in the horizontal direction and improves resolution in the horizontal direction.

The image deflection section De in the image display device 1F according to the second configuration example may have a substantially similar vertical configuration to that according to the first configuration example (FIG. 16).

Other configurations, operations, and effects may be substantially similar to those of the image display device according to the first to third embodiments described above.

5. Fifth Embodiment

Next, an image display device according to a fifth embodiment of the present disclosure is described. It is to be noted that in the following description, constituent elements that are substantially the same as those of the image display device according to any of the first to fourth embodiments described above are indicated by the same reference signs, and description thereof is omitted as appropriate.

FIG. 18 illustrates a configuration example of the image source Pj in the image display device according to the fifth embodiment in a top view.

As described in the first embodiment above, the image source Pj according to the technology of the present disclosure may include, for example, a projector such as a LCOS type projector, a DMD type MEMS projector, or a single mirror type MEMS projector. Furthermore, as illustrated in FIG. 18, the image source Pj may include a scanning projector that generates the projection image Lpj by scanning a plurality of laser light beams incident on a single scanning mirror at different angles.

The image source Pj illustrated in FIG. 18 includes an MEMS mirror 11 serving as a single scanning mirror, an edge emitting laser array or a VCSEL (Vertical Cavity Surface Emitting Laser) 12 serving as a laser light source, and a focusing lens 13.

The VCSEL 12 is a surface emitting semiconductor laser that outputs a plurality of laser light beams. The focusing lens 13 focuses the plurality of laser light beams outputted from the VCSEL 12 toward the MEMS mirror 11 at different angles. The MEMS mirror 11 is, for example, a two-axis movable mirror having a mirror surface tiltable about two axes.

As with the image source Pj illustrated in FIG. 18, a scanning projector may be adopted that projects the plurality of area images Lpjn through scanning by emitting a plurality of laser light beams at different angles toward the MEMS mirror 11, which serves as a single scanning mirror, to allocate the laser light beams to the respective area images Lpjn. This widens an angle of view of the image source Pj, and thus allows for further reduction of the number of light sources (image sources) necessary for displaying images from a plurality of viewpoints, as compared with the image display device according to the comparative example illustrated in FIG. 1.

According to the configuration of the image source Pj illustrated in FIG. 18, causing a plurality of laser light beams to enter a single scanning mirror at different angles and scanning the plurality of laser light beams makes it possible to achieve a wide angle and improve resolution while maintaining a laser modulation frequency.

The image source Pj outputs, for example, the projection image Lpj in a range of 83.5° in the horizontal direction as illustrated in FIG. 18. The four area images Lpj1, Lpj2, Lpj3, and Lpj4 obtained by dividing the projection image Lpj into areas by 20.5° in the horizontal direction, for example, enter the image deflection section De.

It is to be noted that the MEMS mirror 11 is controlled to deflect and project one area image Lpjn using one laser light beam in FIG. 18, but the MEMS mirror 11 may be controlled to deflect and project two or more area images Lpjn using one laser light beam.

Other configurations, operations, and effects may be substantially similar to those of the image display device according to the first to fourth embodiments described above.

6. Other Embodiments

The technology according to the present disclosure is not limited to the description of the embodiments given above, and may be modified in a variety of ways.

For example, each of the embodiments is described above using an example in which the image deflection section has the magnifying function in the horizontal direction, but a configuration may be employed in which the image deflection section does not have the magnifying function in the horizontal direction. For example, a configuration may be employed in which the shape of the curved mirrors Mcn in the configuration of the image deflection section De illustrated in FIG. 11 is changed to a planar shape in the horizontal direction, so that the image deflection section De only has the deflecting function in the horizontal direction. For another example, a configuration may be employed in which the diffraction regions Han in the configuration of the image deflection section De illustrated in FIG. 14 only has the deflecting function and does not have the magnifying function in the horizontal direction.

The present technology may have, for example, any of the following configurations.

According to the present technology in any of the following configurations, images from a plurality of viewpoints are displayed by dividing a projection image from an image source into a plurality of area images, and deflecting and projecting, toward a screen, the plurality of area images at respective angles different from each other, which makes it possible to display a multi-view image at low cost with a small-sized configuration.

(1)

An image display device including: one or more image sources that output a two-dimensional projection image; and one or more image deflection sections that generate a plurality of area images by dividing the projection image from the image source into a plurality of areas at least in a horizontal direction, and deflects and projects, toward a screen having anisotropic diffusion properties, the plurality of area images at respective angles different from each other to partially overlap the plurality of area images with each other on the screen and thereby display images from a plurality of viewpoints.

(2)

The image display device according to (1), in which the image deflection section deflects and projects, toward the screen, the plurality of area images at respective angles different from each other in a magnified manner.

(3)

The image display device according to (1) or (2), in which the image deflection section includes one or more mirror arrays having a plurality of mirrors arranged in the horizontal direction, and each of the plurality of mirrors has a curved shape or a planar shape in the horizontal direction.

(4)

The image display device according to (3), in which each of the plurality of mirrors has a curved shape in the horizontal direction and has a planar shape or a curved shape in a vertical direction.

(5)

The image display device according to claim (3) or (4), in which the image deflection section includes a plurality of the mirror arrays, and the plurality of mirror arrays is arranged in a vertical direction.

(6)

The image display device according to (5), in which arrangement of the plurality of mirrors in the horizontal direction is same among the plurality of mirror arrays disposed at different positions in the vertical direction.

(7)

The image display device according to (5), in which arrangement of the plurality of mirrors in the horizontal direction is different among the plurality of mirror arrays disposed at different positions in the vertical direction.

(8)

The image display device according to (2), in which the image deflection section includes a mirror array having a plurality of mirrors arranged in the horizontal direction and a magnifying lens disposed between the image source and the mirror array.

(9)

The image display device according to (8), in which each of the plurality of mirrors has a planar shape or a curved shape in the horizontal direction and has a planar shape or a curved shape in a vertical direction.

(10)

The image display device according to (1) or (2), in which the image deflection section includes a diffractive element having a plurality of diffraction regions arranged in the horizontal direction, and each of the plurality of diffraction regions has a deflecting function at least in the horizontal direction.

(11)

The image display device according to any one of (1) to (10), in which the image source includes a liquid crystal projector that generates the projection image using a reflective liquid crystal element.

(12)

The image display device according to any one of (1) to (10), in which the image source includes a projector that generates the projection image using a plurality of movable mirrors arranged two-dimensionally.

(13)

The image display device according to any one of (1) to (10), in which the image source includes a scanning projector that generates the projection image using a single scanning mirror.

(14)

The image display device according to (13), in which the image source includes a scanning projector that generates the projection image by scanning a plurality of laser light beams incident on the single scanning mirror at different angles.

(15)

The image display device according to any one of (1) to (14), in which a plurality of image display units is included, the plurality of image display units being sets each including one of the image sources and one of the image deflection section.

(16)

The image display device according to any one of (1) to (15), in which the screen includes a flat transmissive or reflective screen having anisotropic diffusion properties that provides different light diffusion properties in the horizontal direction and in a vertical direction.

(17)

The image display device according to any one of (1) to (15), in which the screen includes a cylindrical transmissive or reflective screen having anisotropic diffusion properties that provides different light diffusion properties in the horizontal direction and in a vertical direction.

(18)

The image display device according to any one of (1) to (17), in which the screen includes an anisotropic diffusion plate that provides different light diffusion properties in the horizontal direction and in a vertical direction.

(19)

The image display device according to any one of (1) to (17), in which the screen includes a diffractive element having anisotropic diffusion properties that provides different light diffusion properties in the horizontal direction and in a vertical direction.

(20)

The image display device according to any one of (1) to (19), in which the image source is disposed between the screen and the image deflection section.

This application claims the benefits of Japanese Priority Patent Application No. 2018-083669 filed with the Japan Patent Office on Apr. 25, 2018, the entire contents of which is incorporated herein by reference.

It should be understood by those skilled in the art that various modifications, combinations, sub-combinations and alternations may occur depending on design requirements and other factors insofar as they are within the scope of the appended claims or the equivalents thereof.

The invention claimed is:

1. An image display device, comprising:
   a cylindrical screen having anisotropic diffusion properties that provides different light diffusion properties in a horizontal direction and in a vertical direction, wherein the cylindrical screen is one of a cylindrical transmissive screen or a cylindrical reflective screen;
   a reflecting mirror above the cylindrical screen;
   at least one image source configured to output a two-dimensional projection image; and
   at least one image deflection section configured to:
      generate a plurality of area images by division of the two-dimensional projection image from the at least one image source into a plurality of areas at least in the horizontal direction, and
      deflect and project, toward the reflecting mirror that is above the cylindrical screen, the plurality of area images at different angles,
   wherein the reflecting mirror that is above the cylindrical screen is configured to:
      reflect the plurality of area images onto the cylindrical screen to partially overlap a first area image of the plurality of area images with a second area image of the plurality of area images on the cylindrical screen, and
      display a plurality of viewpoint images from a plurality of viewpoints on the cylindrical screen by the partial overlap of the first area image and the second area image.

2. The image display device according to claim 1, wherein the at least one image deflection section is further configured to deflect and project the plurality of area images in a magnified manner.

3. The image display device according to claim 2, wherein the at least one image deflection section includes:
   a mirror array having a plurality of mirrors arranged in the horizontal direction, and
   a magnifying lens between the at least one image source and the mirror array.

4. The image display device according to claim 3, wherein each of the plurality of mirrors has one of a planar shape or a curved shape in the horizontal direction and has one of planar shape or the curved shape in the vertical direction.

5. The image display device according to claim 1, wherein the at least one image deflection section includes a mirror array having a plurality of mirrors arranged in the horizontal direction, and
   each of the plurality of mirrors has one of a curved shape or a planar shape in the horizontal direction.

6. The image display device according to claim 5, wherein each of the plurality of mirrors has the curved shape in the horizontal direction and has one of a planar shape or the curved shape in the vertical direction.

7. The image display device according to claim 5, wherein the at least one image deflection section further includes a plurality of mirror arrays including the mirror array, each of the plurality of mirror arrays includes the plurality of mirrors, and
   the plurality of mirror arrays is arranged in the vertical direction.

8. The image display device according to claim 7, wherein an arrangement of the plurality of mirrors in the horizontal direction is same among the plurality of mirror arrays different positions in the vertical direction.

9. The image display device according to claim 7, wherein an arrangement of the plurality of mirrors in the horizontal direction is different among the plurality of mirror arrays at different positions in the vertical direction.

10. The image display device according to claim 1, wherein
   the at least one image deflection section includes a diffractive element having a plurality of diffraction regions arranged in the horizontal direction, and
   each of the plurality of diffraction regions has a deflecting function at least in the horizontal direction.

11. The image display device according to claim 1, wherein the at least one image source includes a liquid crystal projector configured to generate the two-dimensional projection image using a reflective liquid crystal element.

12. The image display device according to claim 1, wherein the at least one image source includes a projector configured to generate the two-dimensional projection image using a plurality of movable mirrors arranged two-dimensionally.

13. The image display device according to claim 1, wherein the at least one image source includes a scanning projector configured to generate the two-dimensional projection image using a single scanning mirror.

14. The image display device according to claim 1, wherein the at least one image source includes a scanning projector configured to generate the two-dimensional projection image by scanning a plurality of laser light beams incident on a single scanning mirror at different angles.

15. The image display device according to claim 1, further comprising a plurality of image display units, wherein each of the plurality of image display units includes one of the at least one image source and one of the at least one image deflection section.

16. The image display device according to claim 1, wherein the cylindrical screen includes an anisotropic diffusion plate that provides the different light diffusion properties in the horizontal direction and in the vertical direction.

17. The image display device according to claim 1, wherein the cylindrical screen includes a diffractive element having the anisotropic diffusion properties that provides the different light diffusion properties in the horizontal direction and in the vertical direction.

18. The image display device according to claim 1, wherein the at least one image source is between the cylindrical screen and the at least one image deflection section.

* * * * *